(12) United States Patent
Kheradmand et al.

(10) Patent No.: US 12,168,543 B2
(45) Date of Patent: Dec. 17, 2024

(54) POLYGONIC BOTTLE AND ITS USES

(71) Applicant: GIVE H2O LLC, Somerville, MA (US)

(72) Inventors: Nema Kheradmand, Somerville, MA (US); Henrik Ilvesmäki, Somerville, MA (US)

(73) Assignee: GIVE H2O LLC, Somerville, MA (US)

( * ) Notice: Subject to any disclaimer, the term of this patent is extended or adjusted under 35 U.S.C. 154(b) by 745 days.

(21) Appl. No.: 17/201,253

(22) Filed: Mar. 15, 2021

(65) Prior Publication Data

US 2021/0292037 A1    Sep. 23, 2021

Related U.S. Application Data

(60) Provisional application No. 62/993,256, filed on Mar. 23, 2020.

(51) Int. Cl.
| | | |
|---|---|---|
| *B65D 1/02* | (2006.01) | |
| *B65D 23/10* | (2006.01) | |
| *B65D 41/04* | (2006.01) | |
| *B65D 41/10* | (2006.01) | |
| *B65D 41/16* | (2006.01) | |
| *C02F 1/00* | (2023.01) | |

(52) U.S. Cl.
CPC ......... *B65D 1/0246* (2013.01); *B65D 1/0207* (2013.01); *B65D 23/102* (2013.01); *B65D 41/0435* (2013.01); *B65D 41/10* (2013.01); *B65D 41/16* (2013.01); *C02F 1/002* (2013.01); *B65D 2501/0081* (2013.01); *C02F 2307/02* (2013.01)

(58) Field of Classification Search
CPC .. B65D 1/0246; B65D 1/0207; B65D 23/102; B65D 41/0435; B65D 41/10; B65D 41/16; B65D 2501/0081; B65D 21/0201; C02F 1/002; C02F 2307/02; C02F 2201/002
See application file for complete search history.

(56) References Cited

U.S. PATENT DOCUMENTS

| | | | | |
|---|---|---|---|---|
| D263,683 | S | * | 4/1982 | Mansau .......................... D9/544 |
| 5,096,095 | A | * | 3/1992 | Burton ................. B67D 1/0456 |
| | | | | 222/173 |
| D542,136 | S | * | 5/2007 | Lilico ............................ D9/520 |
| D642,930 | S | * | 8/2011 | Premo ........................... D9/559 |

(Continued)

*Primary Examiner* — Kareen K Thomas
(74) *Attorney, Agent, or Firm* — Brown Rudnick LLP; Adam M. Schoen

(57) ABSTRACT

The invention herein provides a bottle for carrying a fluid or a semifluid, the bottle including: a mouth, a top section, a body, a bottom section, and a base each located sequentially on a y-axis; the body of the bottle comprising a plurality of planar walls, each wall having the same height and width and located perpendicular to the plane of the base on an x-axis, and a cross section of the body being a polygon selected from: triangle, quadrilateral, pentagon, hexagon, heptagon, octagon, nonagon, decagon, and dodecagon; and a closure having a cross section of a circle or a polygon, and the closure reversibly attachable to the mouth to close the bottle and removable from the mouth to open the bottle. Further, the invention describes methods to obtain purified water using a filtration and purification device.

18 Claims, 30 Drawing Sheets

(56) References Cited

U.S. PATENT DOCUMENTS

| | | | |
|---|---|---|---|
| D661,199 S * | 6/2012 | Bennett | D9/558 |
| D748,480 S * | 2/2016 | Cobb | D9/569 |
| D764,922 S * | 8/2016 | Eble | D9/569 |
| 10,017,312 B2 * | 7/2018 | Oguchi | B65D 1/0276 |
| D836,446 S * | 12/2018 | Murac | D9/559 |
| D840,241 S * | 2/2019 | Mandelbaum | D9/569 |
| D851,495 S * | 6/2019 | Kataoka | D9/563 |
| D867,153 S * | 11/2019 | Hammond | D9/559 |
| 2001/0030166 A1 * | 10/2001 | Ozawa | B65D 23/102 215/381 |
| 2006/0207962 A1 * | 9/2006 | Coley | B65D 79/0084 215/382 |
| 2020/0407100 A1 * | 12/2020 | Hsu | B65D 3/22 |
| 2021/0292037 A1 * | 9/2021 | Kheradmand | B65D 23/102 |
| 2022/0370844 A1 * | 11/2022 | Arakelian | A62C 31/02 |

* cited by examiner

POLYGONIC BOTTLE AND ITS USES

RELATED APPLICATION

This application claims the benefit of and priority to U.S. provisional application No. 62/993,256 entitled, "Polygonic bottle and its uses" by inventors Nema Kheradmand and Henrik Ilvesmäki filed Mar. 23, 2020 which is hereby incorporated by reference herein in its entirety.

BACKGROUND

Water makes up approximately 70% weight of a human body. A human body can survive without food for about a month however, a human body cannot survive without drinking water for more than 2-3 days. Therefore, water is extremely important to a human body. Purified and filtered drinking water is of utmost importance for proper hydration and to maintain good health.

Traditional water bottles are made of materials such as plastic which are harmful to the environment. Further, these bottles are often internally lined with Poly Ethylene Terephthalate (PET) which is harmful to the health of the person consuming water and to the environment. The traditional water bottles are cylindrical in shape and hence fail to provide a grip for holding the water bottle. Further the cylindrical bottles are prone to rolling and create dents in the body of the bottle. The traditional bottles due to the cylindrical shape of the bottle result in super-elliptical interstitial space between bottles. The interstitial space creates dead space and leads to swaying of the bottles resulting in damage to the bottles during transport. Further, to prevent damage to the cylindrical bottles the interstitial dead space is filled by packing material which causes more pollution and is harmful to the environment. Therefore, the traditional bottles are not optimized for transportation with respect to capacity and packing efficiency.

There is a need for bottles which are recyclable, environmentally sustainable and are designed to be optimized for transportation and efficiency.

SUMMARY

An aspect of the invention described herein provides a bottle for carrying a fluid or a semifluid, the bottle including:
a mouth, a top section, a body, a bottom section, and a base each located sequentially on a y-axis;
the body of the bottle including a plurality of planar walls, each wall having the same height and width and located perpendicular to the plane of the base on an x-axis, and a cross section of the body being a polygon selected from: triangle, quadrilateral, pentagon, hexagon, heptagon, octagon, nonagon, decagon, and dodecagon; and
a closure having a cross section of a circle or a polygon, and the closure reversibly attachable to the mouth to close the bottle and removable from the mouth to open the bottle.

In an embodiment of the bottle, each wall further includes at least one filleted edge. In an embodiment of the bottle the top section and the bottom section is circular as viewed transversely. In an alternative embodiment of the bottle the top section and/or the bottom section is the polygon as viewed transversely. For example, the polygon of the body is congruent to the polygon of the top and/or the bottom section.

In some embodiments of the bottle the top section further includes a top shoulder section proximal to the mouth and the bottom section further includes a bottom shoulder section proximal to the base. An embodiment of the bottle further includes filleted edges at wall junctions of the body and, between the body and at least one of: the top shoulder section and the bottom shoulder section, and between the bottom shoulder section and the base.

In an embodiment of the bottle the transverse views of the polygonic closure and cross section of the body of the bottle include congruent polygons. In an embodiment of the bottle the base is planar on the x-axis or is concave.

In an embodiment of the bottle the closure is selected from: a lid, a cap, and a seal. In an embodiment of the bottle the closure is a cap that reversibly closes the bottle by at least one mechanism selected from: a thread, a crown, and a snap. In some embodiments of the bottle the threads are located on an interior surface of the cap and on an exterior surface of the mouth of the bottle. In an embodiment of the bottle the cap further includes a sealing ring located on the interior surface. In some embodiments of the bottle the closure is single walled or double walled.

In some embodiments of the bottle the number of turns of the threads are selected from: 1, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, and 10.75. The volume of the bottle is at least one selected from: about 100 ml to about 250 ml, about 250 ml to about 500 ml, about 500 ml to about 750 ml, about 750 ml to about 1000 ml, about 1000 ml to about 1500 ml, about 1500 ml to about 2000 ml, about 2000 ml to about 2500 ml, about 2500 ml to about 3000 ml, 3000 ml to about 4000 ml, and 4000 ml to about 5000 ml.

An embodiment of the bottle includes at least one material selected from: plant based plastic, plastic, polyethylene (PE) plastic, brass, copper, aluminum, steel, stainless steel, silver, titanium, glass, bagasse paper, paper, cardboard, wood, wood veneer, and laminated wood. In an embodiment of the bottle the mouth of the bottle is configured to receive a water purification and filtration device and the height of the bottle configured to reversibly contain the device.

An embodiment of the bottle further includes a plurality of the bottles in a package with adjacent bottles contacting along the planar walls and minimal interstitial space. An embodiment of the bottle further includes an area of an exterior surface of the body with a grip or a rough coating.

An aspect of the invention described herein provides a method for providing filtered and purified drinking water to a subject, the method including:
providing a bottle having a mouth, a top section, a body, a bottom section, and a base each located sequentially on a y-axis; the body of the bottle including a plurality of planar walls, each wall having the same height and width and located perpendicular to the plane of the base on an x-axis, and a cross section of the body being a polygon selected from: triangle, quadrilateral, pentagon, hexagon, heptagon, octagon, nonagon, decagon, and dodecagon; and a closure having a cross section of a circle or a polygon, and the closure fitted to reversibly close and open the bottle at the mouth;
adding water to the bottle from an available water source;
inserting a personal purification and filtration device into the water in the bottle; and
incubating at ambient temperature the water and the filter for a prescribed time period, and withdrawing purified water through the filter water thereby providing filtered and purified drinking water to the subject.

An embodiment of the method further includes prior to providing, packaging the bottle in an array of a plurality of bottles in contact along the planar walls with minimal interstitial space. In an embodiment of the method the plurality is larger number of bottles compared to volume equivalent of bottles having circular body cross-section. In an embodiment of the method the personal purification and filtration device is a LifeStraw®. In some embodiments of the method the subject is located in a geographical region characterized by poor quality or inadequate quantity source of aqueous fluid.

An aspect of the invention described herein provides a water bottle including: a mouth section, a top shoulder section, a body section, a bottom shoulder section, and a base section located sequentially on a longitudinal plane; a transverse view of the body is a hexagon or an octagon; the container includes planar filleted sides, and a reversibly removable cap. In an embodiment of the bottle the cap is hexagonal or circular or octagonal. In an embodiment of the bottle the cap is reversibly removable by a thread mechanism. In some embodiments of the bottle the bottle includes aluminum.

An aspect of the invention described herein provides an improvement in a re-usable water bottle, the improvement including the bottle having a plurality of planar walls suitable for bulk packaging and having a mouth and height operative to reversibly receive and contain a filtration device for water purification.

DETAILED DESCRIPTION

Figure 1:
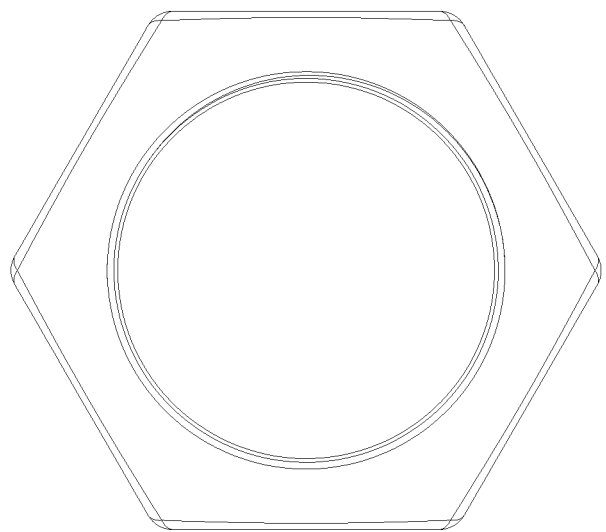
FIG. 1 is a schematic drawing of a top elevation view of an embodiment of a polygon bottle. The bottle has six planar walls in this embodiment and hence is hexagonal in shape. The mouth of the bottle is circular in section. The closure of the bottle in this embodiment is a polygon with six sides and hence is hexagon shaped. The edges in this embodiment of the bottle are filleted.
Figure 2:
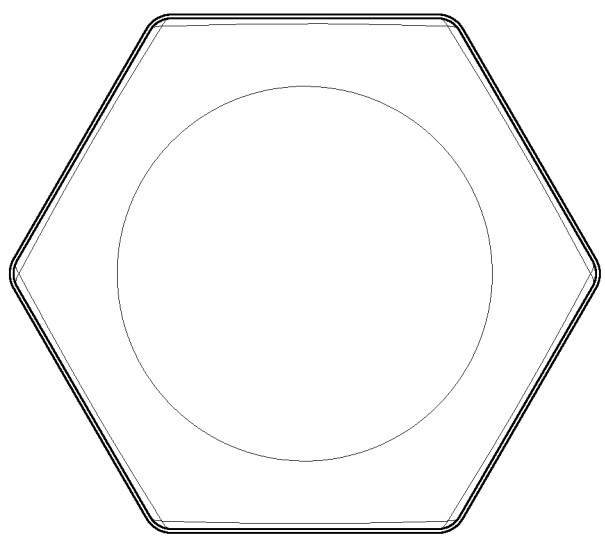
FIG. 2 is a schematic drawing of a transverse section view of the top of an embodiment of a polygon bottle. The bottle has six planar walls in this embodiment. The mouth of the bottle is circular in section. The closure of the bottle in this embodiment is a polygon with six sides and hence is hexagon shaped. The edges in this embodiment of the bottle are filleted.
Figure 3:
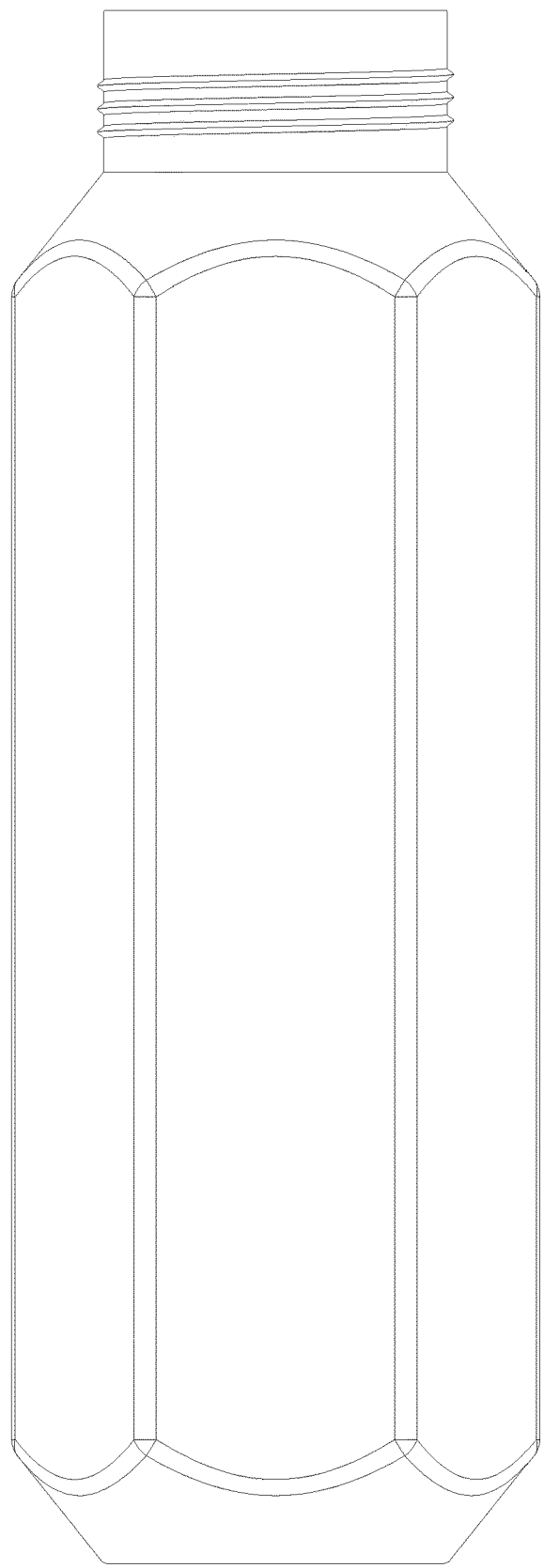
FIG. 3 is a schematic drawing of a front elevation view of an embodiment of a polygon bottle. The bottle has six planar walls in this embodiment. The mouth of the bottle has threads for a closure. The edges in this embodiment of the bottle are filleted.
Figure 4:
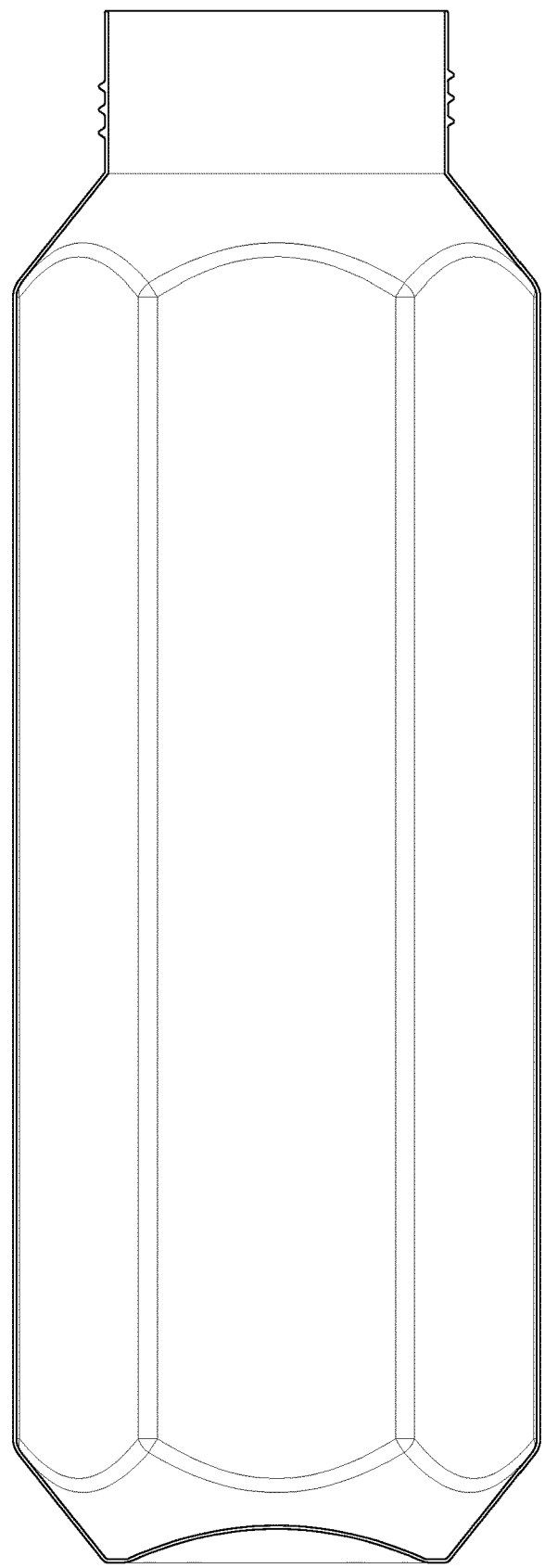
FIG. 4 is a schematic drawing of a frontal section view of an embodiment of a polygon bottle. The bottle has six planar walls in this embodiment. The mouth of the bottle has threads for a closure, and its bottom is concave. The edges in this embodiment of the bottle are filleted.
Figure 5:
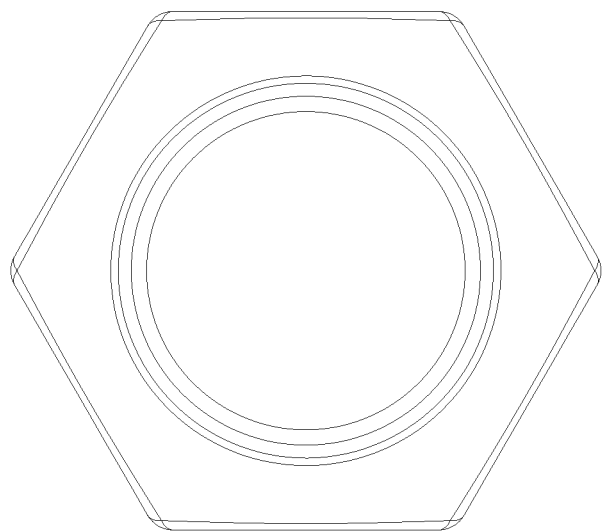
FIG. 5 is a schematic drawing of a bottom elevation view of an embodiment of a polygon bottle. The bottle has six planar walls in this embodiment. The bottom of the bottle is circular in elevation. The edges in this embodiment of the bottle are filleted.
Figure 6:
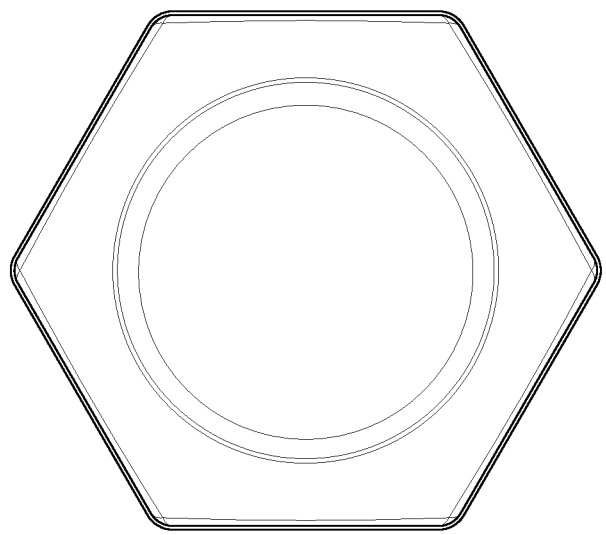
FIG. 6 is a schematic drawing of a transverse section view of the bottom of an embodiment of a polygon bottle. The bottle has six planar walls in this embodiment. The bottom of the bottle is circular in elevation. The edges in this embodiment of the bottle are filleted.
Figure 7:
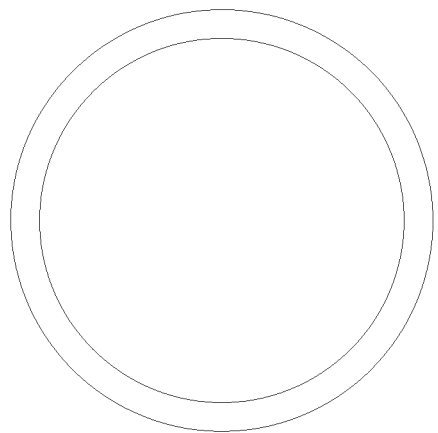
FIG. 7 is a schematic drawing of a top elevation view of an embodiment of a polygon bottle screw cap closure. The closure is cylindrical in shape. The top of the closure is circular in elevation. The edges in this embodiment of the closure are filleted.
Figure 8:
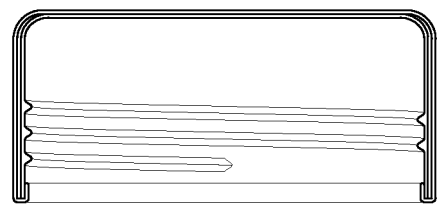
FIG. 8 is a schematic drawing of a sagittal section view of an embodiment of a polygon bottle screw cap closure. The closure is cylindrical in shape and has a two-walled construction in this embodiment. The interior walls of the closure have threads. The edges in this embodiment of the closure are filleted.
Figure 9:
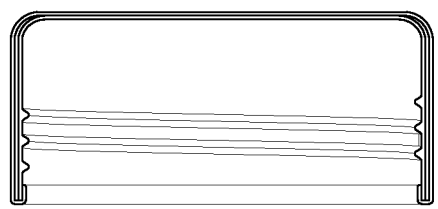
FIG. 9 is a schematic drawing of a frontal section view of an embodiment of a polygon bottle screw cap closure. The closure is cylindrical in shape and has a two-walled construction in this embodiment. The interior walls of the closure have threads. The edges in this embodiment of the closure are filleted.
Figure 10:
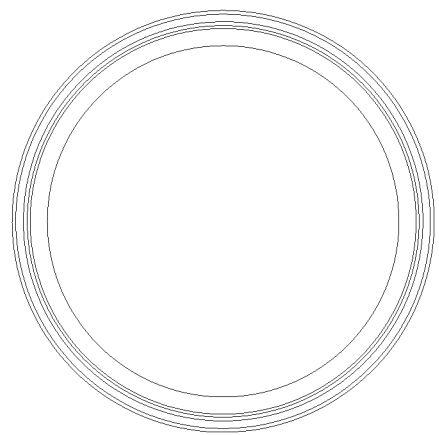
FIG. 10 is a schematic drawing of a bottom elevation view of an embodiment of a polygon bottle screw cap closure. The closure is cylindrical in shape. The bottom of the closure is circular in elevation. The edges in this embodiment of the closure are filleted.
Figure 11:
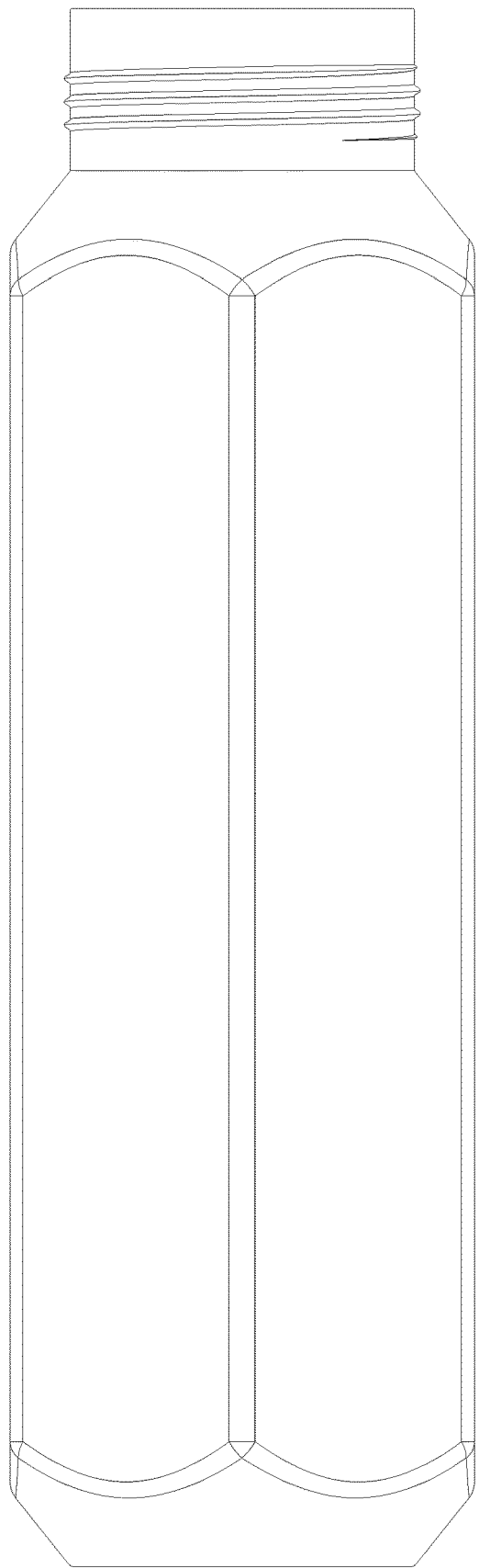
FIG. 11 is a schematic drawing of a sagittal elevation view of an embodiment of a polygon bottle. The bottle has six planar walls in this embodiment. The mouth of the bottle has threads for a closure. The edges in this embodiment of the bottle are filleted.
Figure 12:
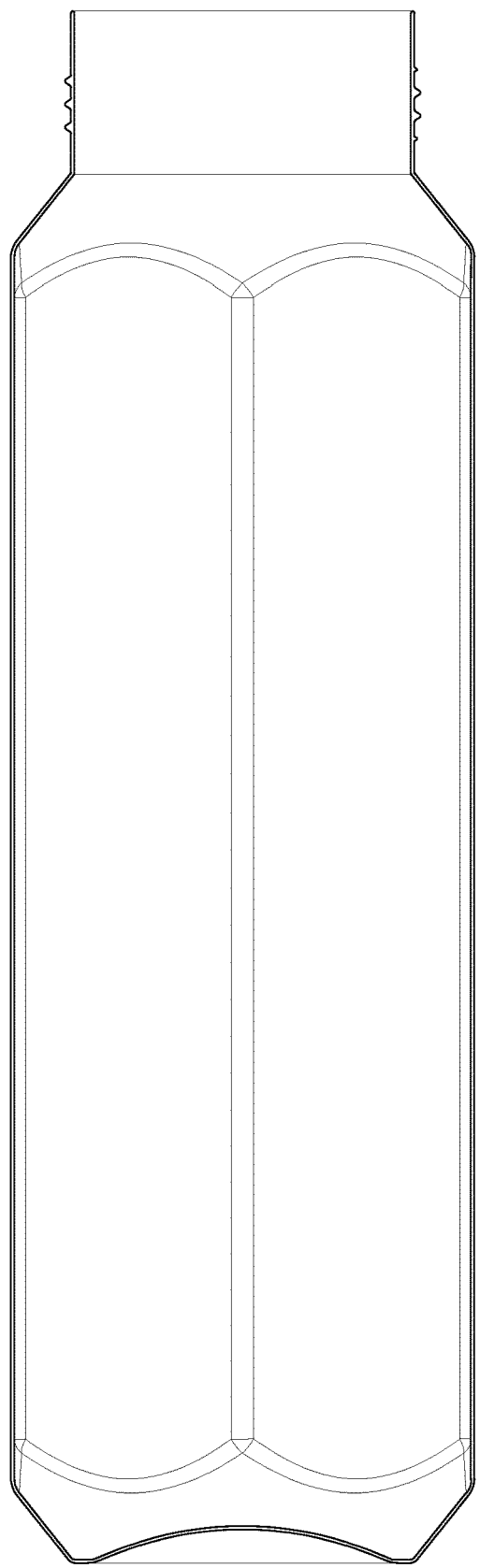
FIG. 12 is a schematic drawing of a sagittal section view of an embodiment of a polygon bottle. The bottle has six planar walls in this embodiment. The mouth of the bottle has threads for a closure, and its bottom is concave. The edges in this embodiment of the bottle are filleted.
Figure 13:
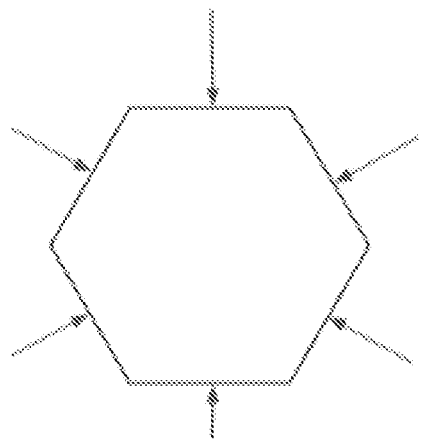
FIG. 13 is a schematic drawing demonstrating that the hexagonal shape of the bottle gives a sturdy and distinct grip. Further, the hexagonal shape resists bumps and stresses and gives a patina to the edges with use over a period of time.
Figure 14:
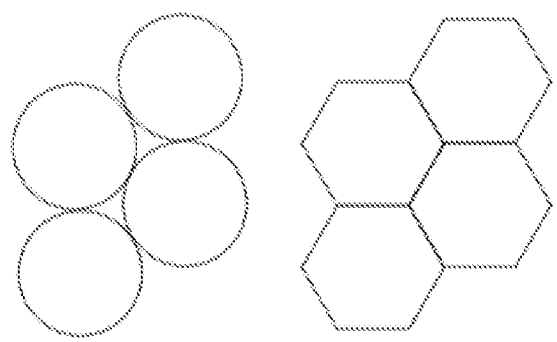
FIG. 14 is a schematic drawing depicting transportation efficiency of the polygonic bottles. Traditional aluminum bottles are not optimized for transportation with respect to capacity and packing efficiency. Further, the traditional circular bottles are prone to dents during transportation. The hexagonal shape of the bottle described herein achieves a greater packing efficiency. The bottles are less susceptible to dents during shipping due to proximity to each other and minimum interstitial space.
Figure 15:
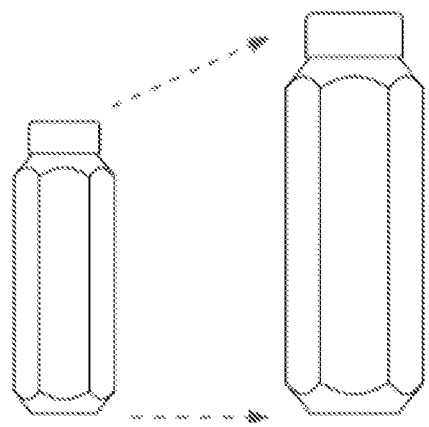
FIG. 15 is a schematic drawing depicting scalability of the polygonal bottles. The polygonal shape leads to easy scalability. For example, to make bottles with larger capacity a hexagonal bottle can be made octagonal and retain the unique faceted design.
Figure 16:
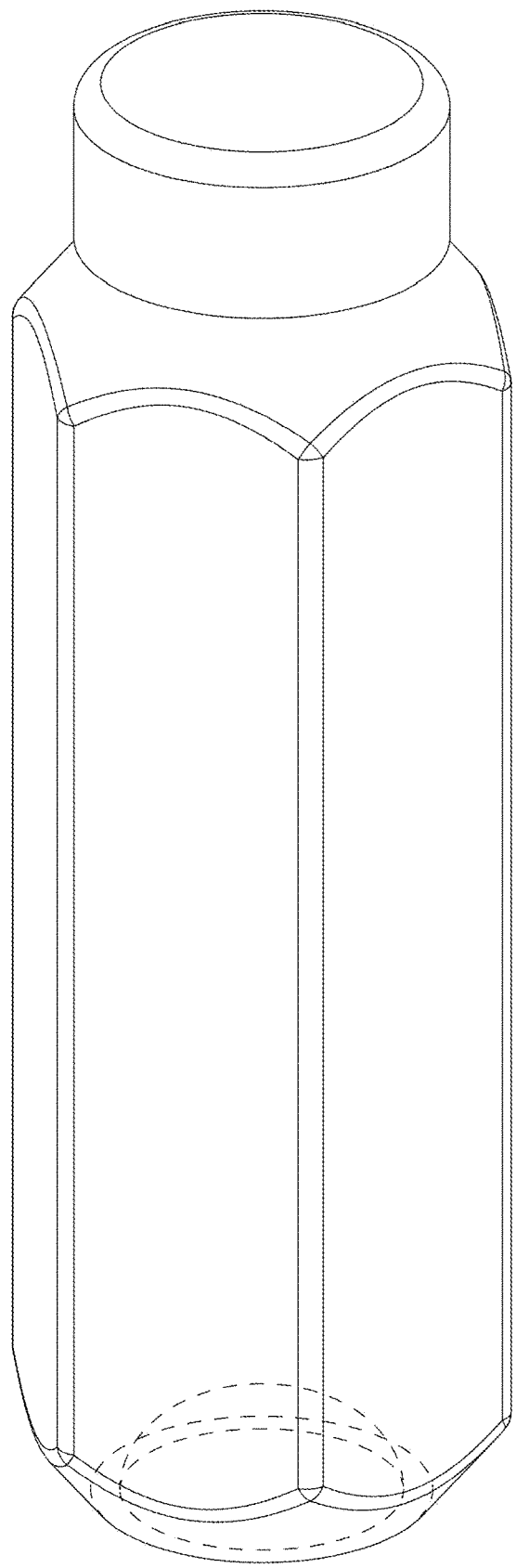
FIG. 16 is a schematic drawing of a top perspective view of an embodiment of a polygon bottle. The bottle has six planar walls in this embodiment. The closure is cylindrical in shape and the bottom of the bottle is concave. The edges in this embodiment of the bottle are filleted.
Figure 17:
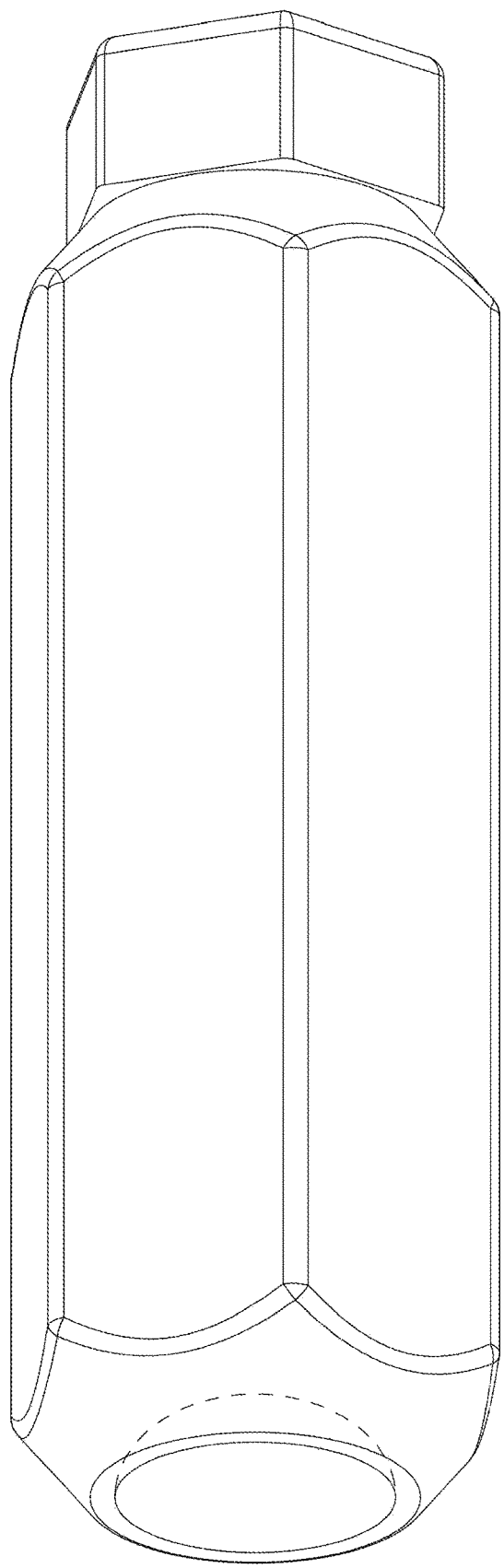
FIG. 17 is a schematic drawing of a top perspective view of an embodiment of a polygon bottle. The bottle has six planar walls in this embodiment. The closure is hexagonal in shape and the bottom of the bottle is concave. The edges in this embodiment of the bottle are filleted.
Figure 18:
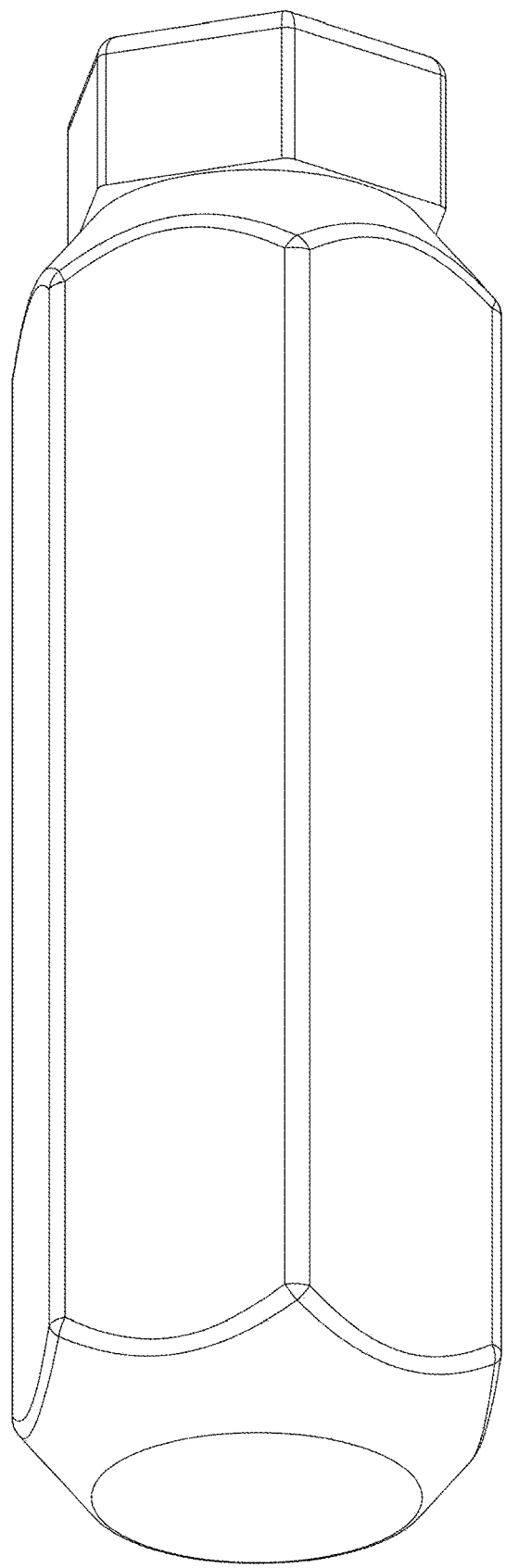
FIG. 18 is a schematic drawing of a bottom perspective view of an embodiment of a polygon bottle. The bottle has six planar walls in this embodiment. The closure is hexagonal in shape and the bottom of the bottle is flat. The edges in this embodiment of the bottle are filleted.
Figure 19:
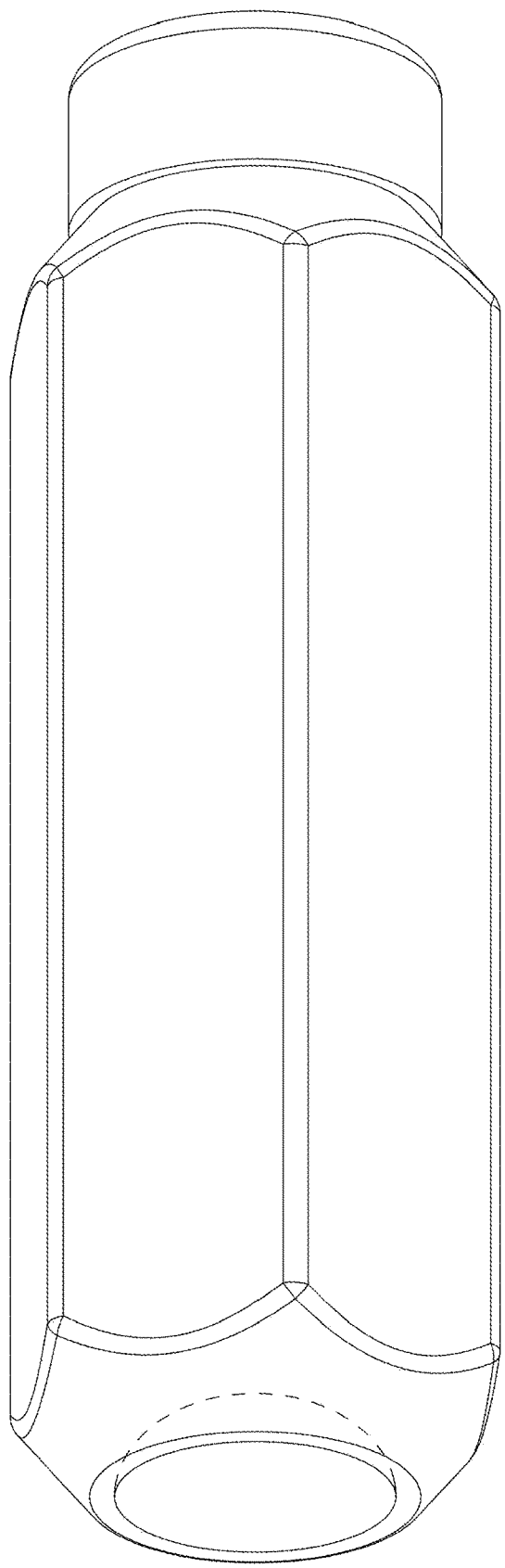
FIG. 19 is a schematic drawing of a bottom perspective view of an embodiment of a polygon bottle. The bottle has six planar walls in this embodiment. The closure is cylindrical in shape and the bottom of the bottle is concave. The edges in this embodiment of the bottle are filleted.
Figure 20:
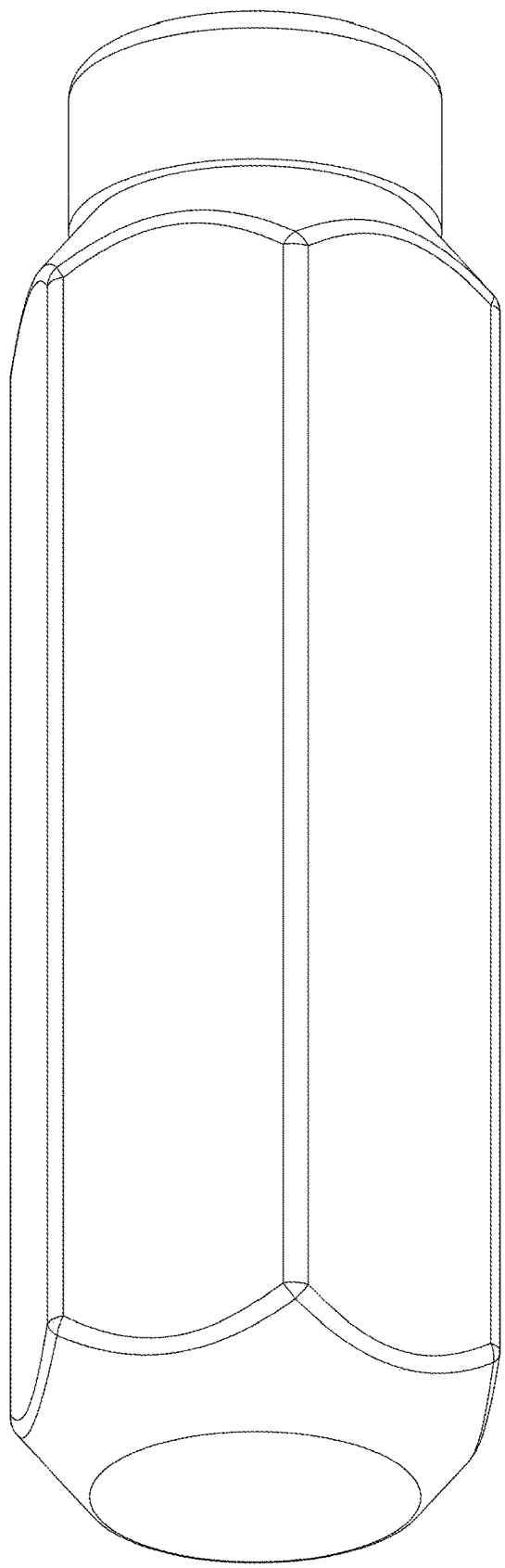
FIG. 20 is a schematic drawing of a bottom perspective view of an embodiment of a polygon bottle. The bottle has six planar walls in this embodiment. The closure is cylindrical in shape and the bottom of the bottle is flat. The edges in this embodiment of the bottle are filleted.
Figure 21:
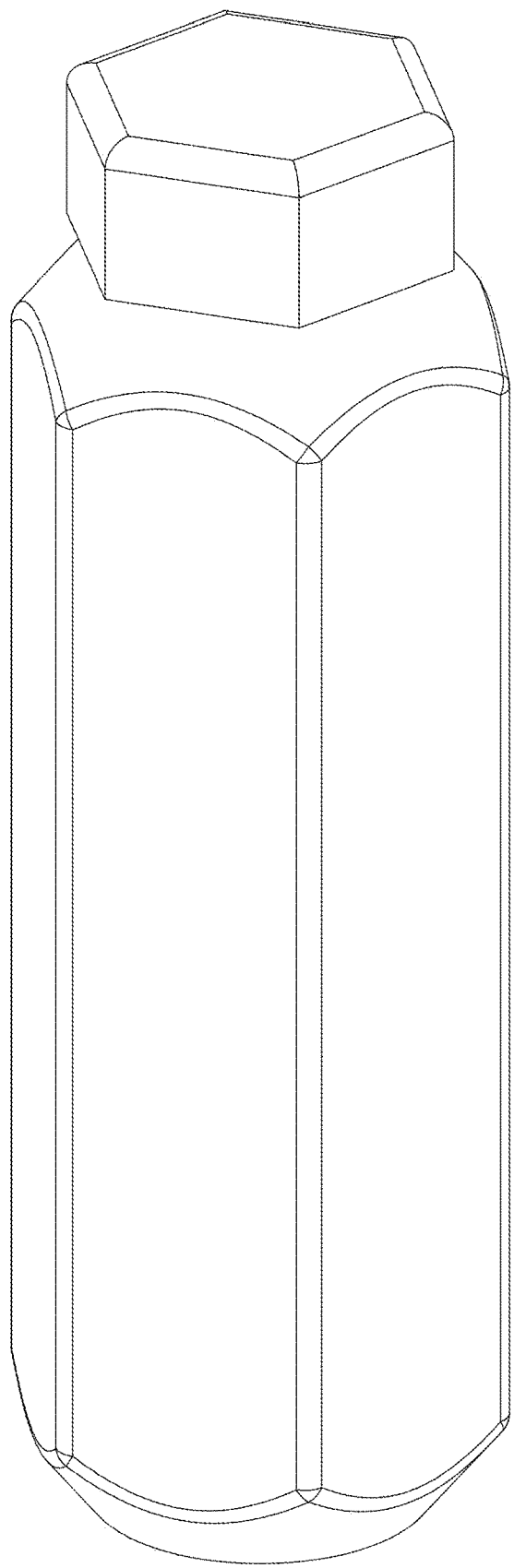
FIG. 21 is a schematic drawing of a top perspective view of an embodiment of a polygon bottle. The bottle has six planar walls in this embodiment. The closure is hexagonal in shape and the bottom of the bottle is flat. The edges of the bottle in this embodiment are filleted however, the edges of the hexagonal closure are not filleted.
Figure 22:
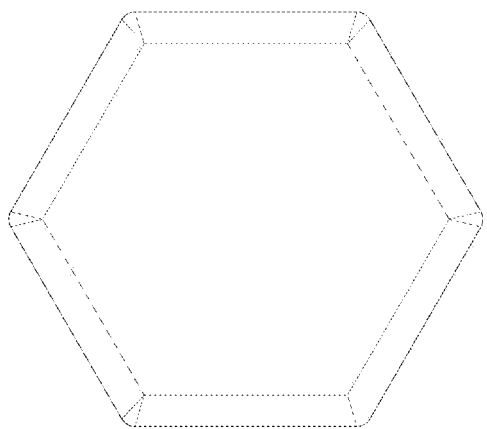
FIG. 22 is a schematic drawing of a top elevation view of an embodiment of a polygon bottle screw cap closure. The closure is hexagonal in shape. The top of the closure is hexagonal in elevation. The edges in this embodiment of the closure are filleted.
Figure 23:
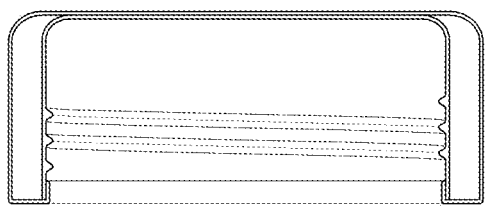
FIG. 23 is a schematic drawing of a sagittal section view of an embodiment of a polygon bottle screw cap closure. The closure is hexagonal in shape and has a two-walled construction in this embodiment. The interior walls of the closure have threads. The edges in this embodiment of the closure are filleted.
Figure 24:
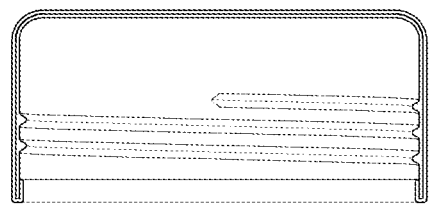
FIG. 24 is a schematic drawing of a frontal section view of an embodiment of a polygon bottle screw cap closure. The closure is hexagonal in shape and has a two-walled construction in this embodiment. The interior walls of the closure have threads. The edges in this embodiment of the closure are filleted.
Figure 25:
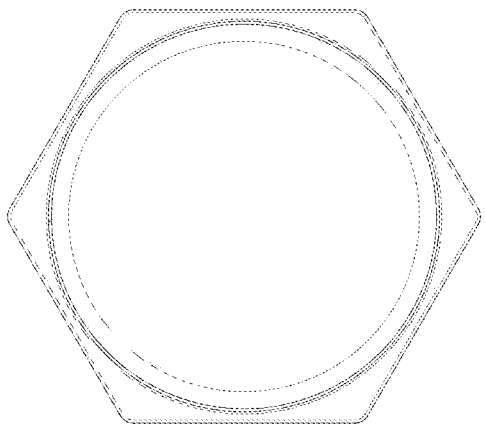
FIG. 25 is a schematic drawing of a bottom elevation view of an embodiment of a polygon bottle screw cap closure. The closure is hexagonal in shape. The bottom of the closure is hexagonal in elevation. The edges in this embodiment of the closure are filleted.
Figure 26:
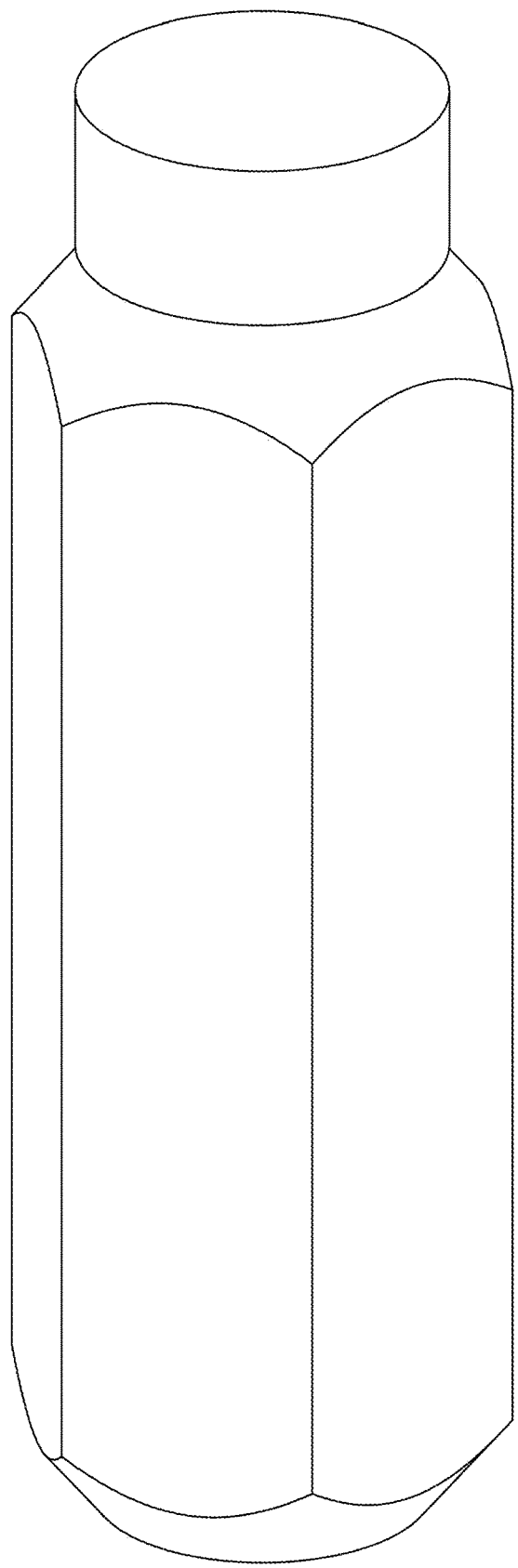
FIG. 26 is a schematic drawing of a top perspective view of an embodiment of a polygon bottle. The bottle has six planar walls in this embodiment. The closure is circular in shape and the bottom of the bottle is flat. The edges of the bottle and the closure in this embodiment are not filleted.
Figure 27:
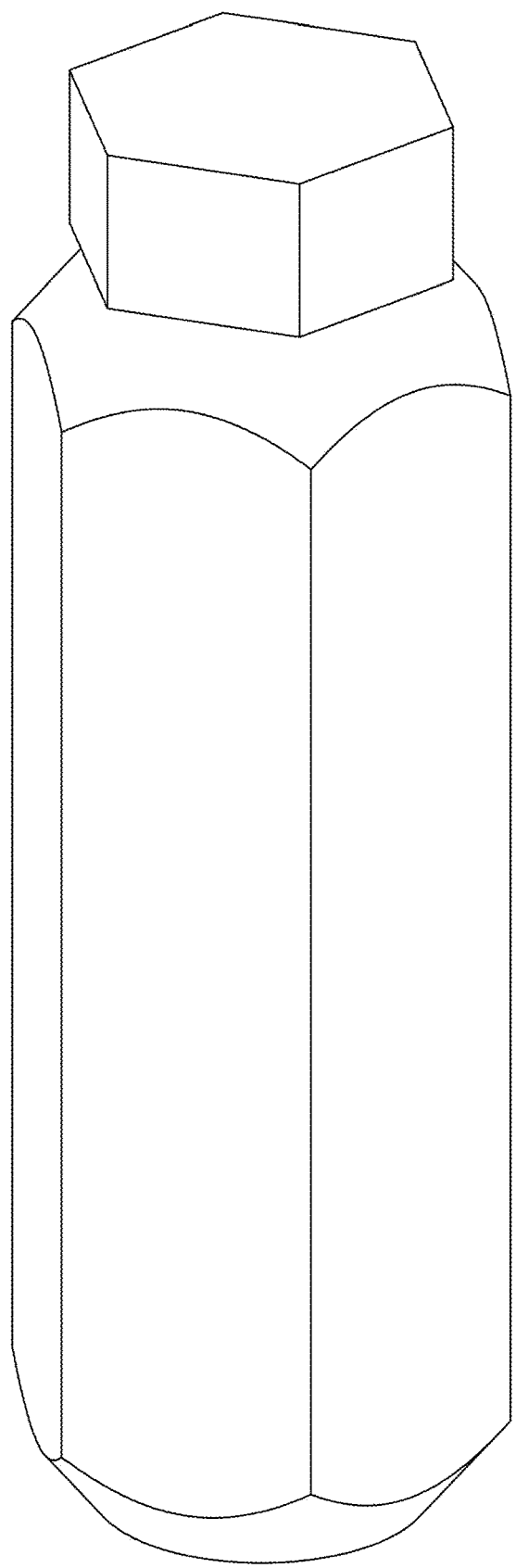
FIG. 27 is a schematic drawing of a top perspective view of an embodiment of a polygon bottle. The bottle has six planar walls in this embodiment. The closure is hexagonal in shape and the bottom of the bottle is flat. The edges of the bottle and the closure in this embodiment are not filleted.
Figure 28:
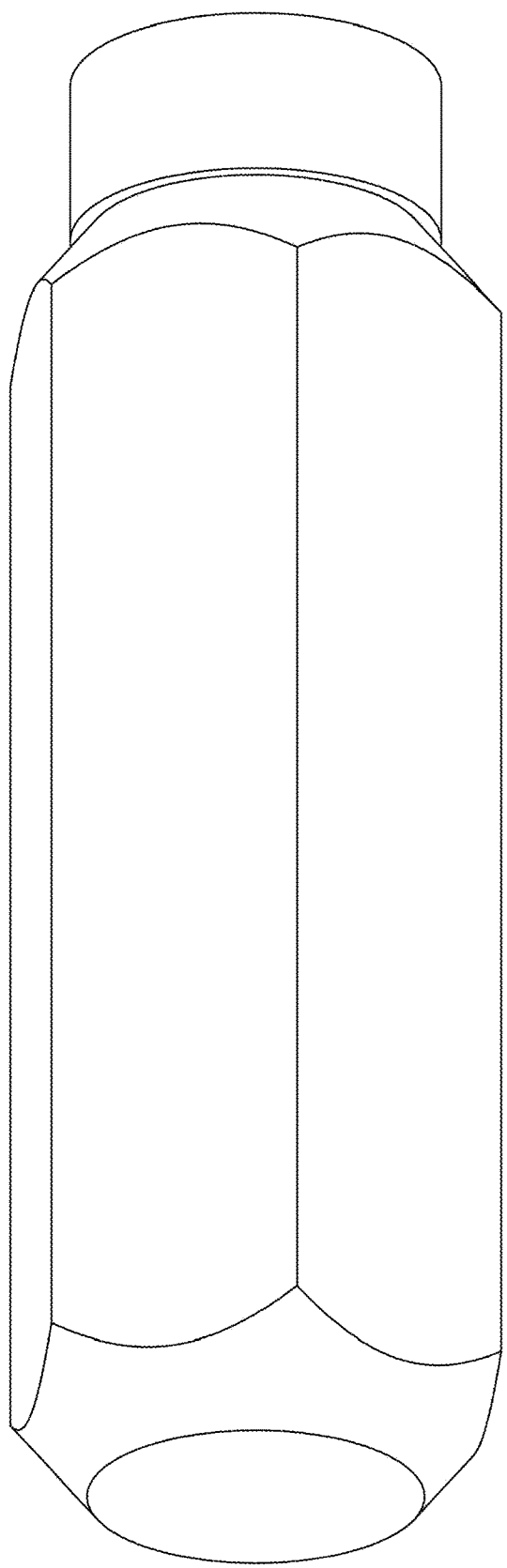
FIG. 28 is a schematic drawing of a bottom perspective view of an embodiment of a polygon bottle. The bottle has six planar walls in this embodiment. The closure is circular in shape and the bottom of the bottle is flat. The edges of the bottle and the closure in this embodiment are not filleted.
Figure 29:
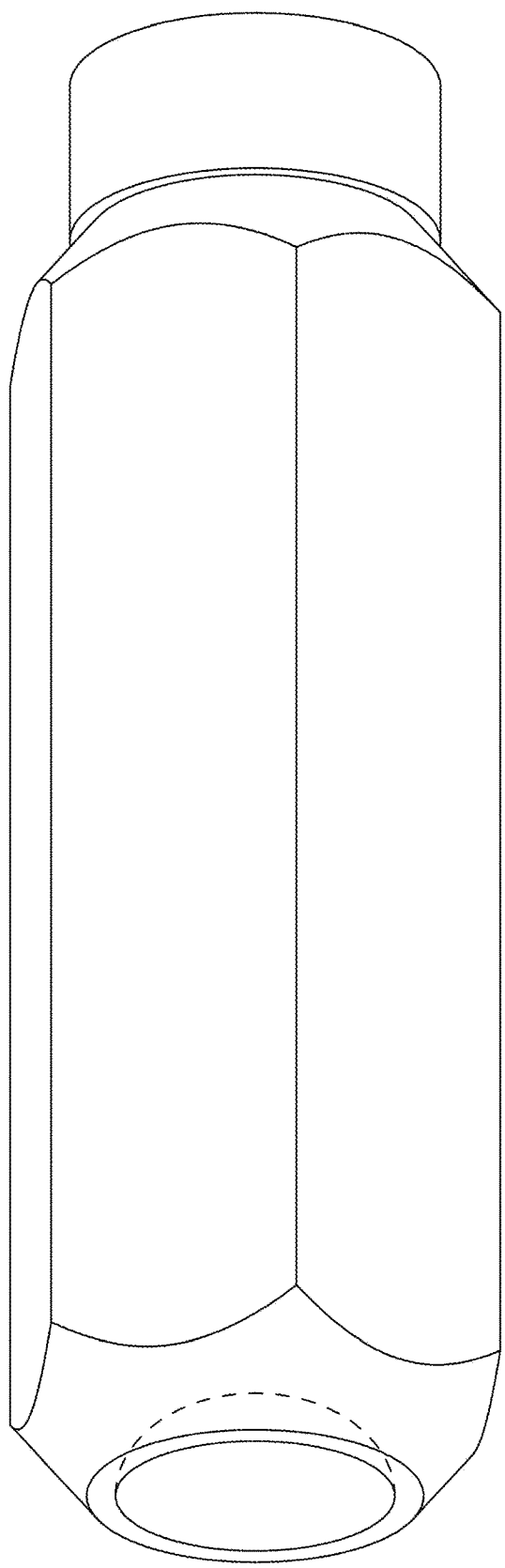
FIG. 29 is a schematic drawing of a bottom perspective view of an embodiment of a polygon bottle. The bottle has six planar walls in this embodiment. The closure is circular in shape and the bottom of the bottle is flat. The edges of the bottle and the closure in this embodiment are not filleted.
Figure 30:
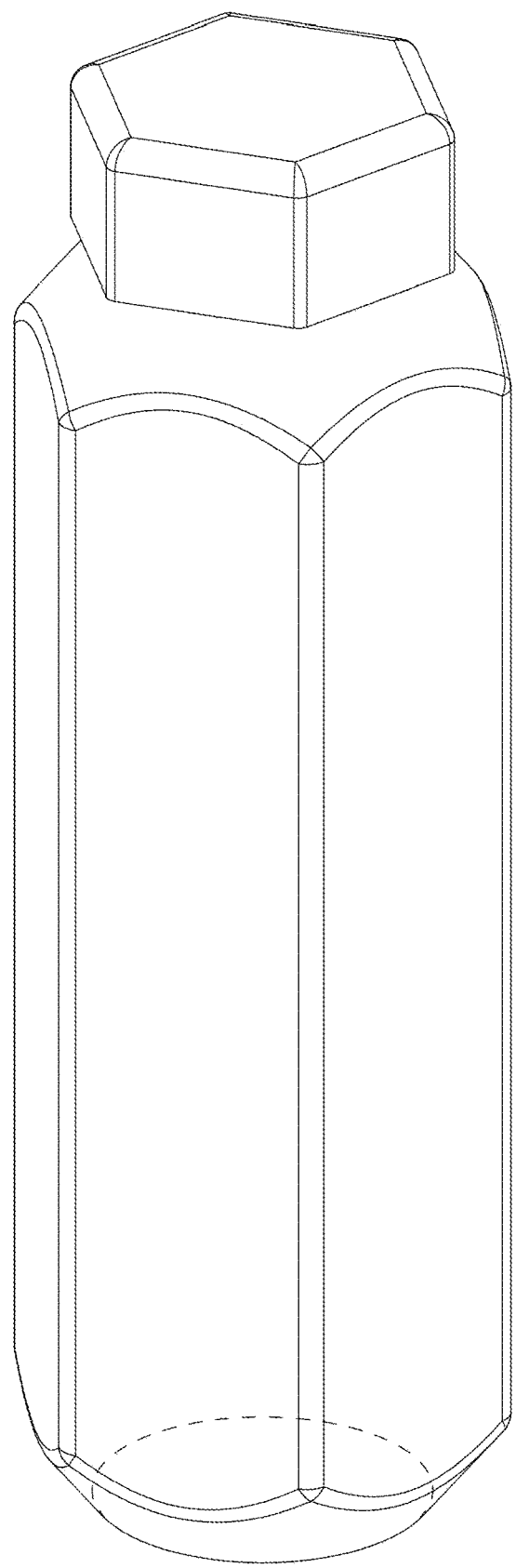
FIG. 30 is a schematic drawing of a top perspective view of an embodiment of a polygon bottle. The bottle has six planar walls in this embodiment. The closure is hexagonal in shape and the bottom of the bottle is flat. The edges in this embodiment of the bottle are filleted.
Figure 31:
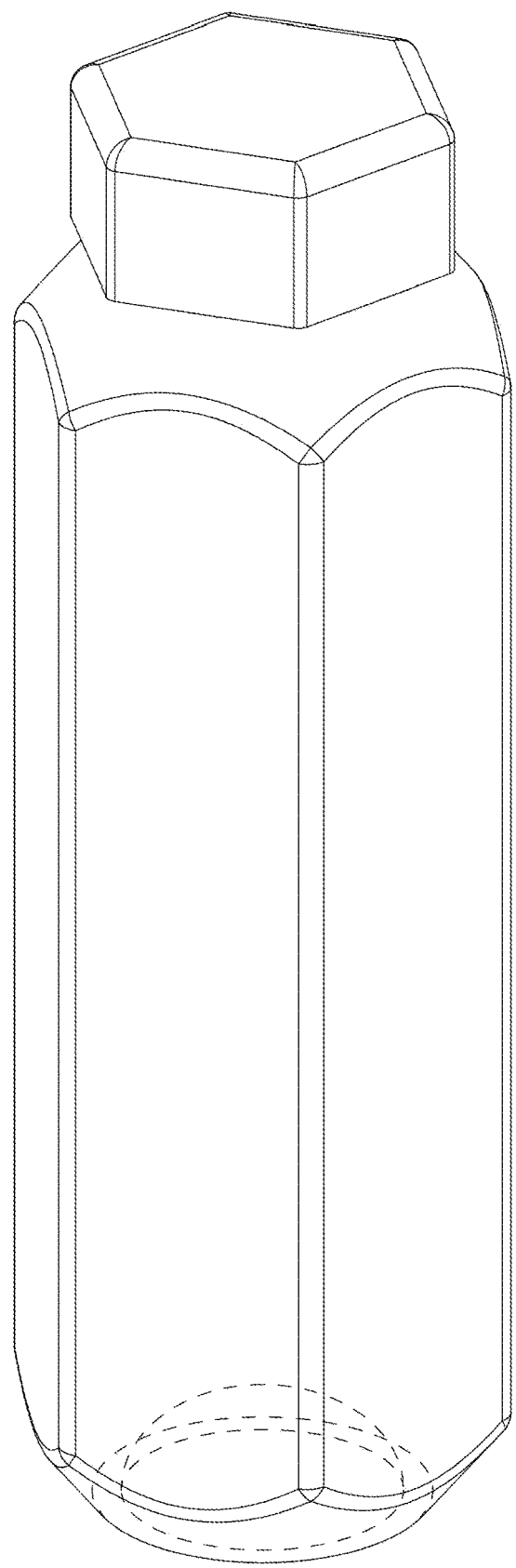
FIG. 31 is a schematic drawing of a top perspective view of an embodiment of a polygon bottle. The bottle has six planar walls in this embodiment. The closure is hexagonal in shape and the bottom of the bottle is concave. The edges in this embodiment of the bottle are filleted.
Figure 32:
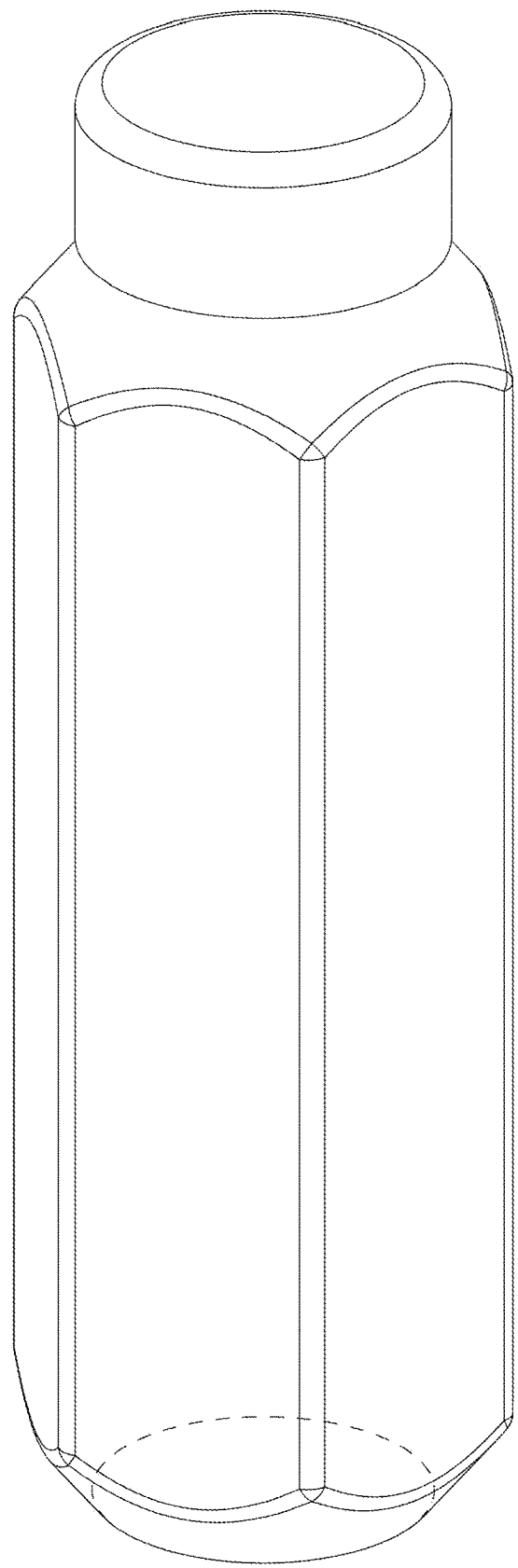
FIG. 32 is a schematic drawing of a top perspective view of an embodiment of a polygon bottle. The bottle has six planar walls in this embodiment. The closure is circular in shape and the bottom of the bottle is flat. The edges in this embodiment of the bottle are filleted.

The bottle described herein features a polygonal, horizontal cross section for packaging and transportation utility. The bottle is designed and optimized to save space. Further, the shape provides a distinct grip feel due to its faceted sides. The filleted edges of the sides result in making the bottle easier to produce in a variety of different materials and making it less likely to suffer damage from exterior hits and contribute to the ease with which one can hold the container.

The bottle vertical cross section and elevation of the bottle illustrates circular, rounded top and bottom parts of the bottle, which serve to make the structure sturdier, and make the bottle easier to produce in different materials, especially metals. The number of threads featured in its threaded closure varies depending on the required strength of the closure necessitated by the application of the bottle the and construction materials. The bottom of the container has a rounded indent, which reduces the surface area that the bottle stands on, thus reducing the chance that the surface imperfections of the plane on which the container is placed upon could tip it.

The vertical cross section of the cap illustrates that its exterior is kept clear of any visible signs of its threaded closure to create a smooth surface, ideal for rotating by hand. This is achieved with either a single or double walled structure.

The various embodiments of the bottle described herein are customizable with respect to contents, external appearance and external surface. The bottle described herein is suitable to contain any of the following products for example, water, mineral water, purified water, distilled water, aerated water, carbonated water, sports drink, electrolyte water, flavored water, juice, fruit juice, drink mixes, milk, flavored milk, buttermilk, cream, cocktail mixers, wine, beer, whiskey, rum, tequila, cognac, vodka, ice wine, hard cider, mixed drinks, and other consumable liquid or semi-liquid products. The exterior surface of the bottle is customizable by addition of labels in form of stickers or prints or by embossment. The customization of the exterior surface of the bottle is based on the contents of the bottle. The exterior appearance of the bottle is modifiable with respect to color and/or texture. For example, if the bottle contains an orange flavored sport drink, the exterior color of the bottle can be orange in color with an orange peel texture and a sticker providing a brand, flavor, nutrition and other relevant information regarding the sport drink.

The inventors here envision providing people with an opportunity to choose healthy beverages and refreshments, helping beverage industry become environmentally sustainable and providing human beings in true poverty access to clean water. The bottle described herein is recyclable, reusable and environmentally sustainable.

The invention now having been fully described, it is further exemplified by the following claims. Those skilled in the art will recognize or be able to ascertain using no more than routine experimentation, numerous equivalents to the specific procedures described herein. Such equivalents are within the scope of the present invention and claims.

What is claimed is:

1. A bottle for carrying a fluid or a semifluid, the bottle comprising:

a mouth, a top section, a body, a bottom section, and a base each located sequentially on a y-axis;

the body of the bottle comprising a plurality of planar walls, each wall having the same height and width and located perpendicular to the plane of the base on an x-axis, and a cross section of the body being a polygon selected from: triangle, quadrilateral, pentagon, hexagon, heptagon, octagon, nonagon, decagon, and dodecagon;

a closure having a cross section of a circle or a polygon, the closure reversibly attachable to the mouth to close the bottle and removable from the mouth to open the bottle, the closure being single walled or double walled, the closure being a cap that reversibly closes the bottle by a mechanism which is a thread, and the threads being located on an interior surface of the cap and on an exterior surface of the mouth of the bottle; and a personal purification and filtration device removably contained, and provided entirely within, the bottle and configured for filtering and purifying a fluid or semifluid.

2. The bottle according to claim 1, the top section and the bottom section being circular as viewed transversely and/or the top section and/or the bottom section being the polygon as viewed transversely.

3. The bottle according to claim 1, the top section further comprising a top shoulder section proximal to the mouth and the bottom section further comprising a bottom shoulder section proximal to the base, and/or each wall further comprising at least one filleted edge.

4. The bottle according to claim 3 further comprising filleted edges at wall junctions of the body and, between the body and at least one of: the top shoulder section and the bottom shoulder section, and between the bottom shoulder section and the base.

5. The bottle according to claim 1, the transverse views of the polygonic closure and cross section of the body of the bottle comprising congruent polygons, and/or the base being planar on the x-axis or concave.

6. The bottle according to claim 1, the cap further comprising a sealing ring located on the interior or the exterior surface.

7. The bottle according to claim 1, the number of turns of the threads are selected from: 1, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, and 10.75.

8. The bottle according to claim 1, volume of the bottle is at least one selected from: about 100 ml to about 250 ml, about 250 ml to about 500 ml, about 500 ml to about 750 ml, about 750 ml to about 1000 ml, about 1000 ml to about 1500 ml, about 1500 ml to about 2000 ml, about 2000 ml to about 2500 ml, about 2500 ml to about 3000 ml, 3000 ml to about 4000 ml, and 4000 ml to about 5000 ml.

9. The bottle according to claim 1, comprising at least one material selected from: plant based plastic, plastic, polyethylene (PE) plastic, brass, copper, aluminum, steel, stainless steel, silver, titanium, glass, bagasse paper, paper, cardboard, wood, wood veneer, and laminated wood.

10. The bottle according to claim 1, further comprising a plurality of the bottles in a package with adjacent bottles contacting along the planar walls and minimal interstitial space and the plurality is larger number of bottles compared to volume equivalent of bottles having circular body cross-section.

11. The bottle according to claim 1, further comprising an area of an exterior surface of the body with a grip or a rough coating.

12. The bottle according to claim 1, wherein the base comprises a bottom having a rounded, inwardly-formed indent.

13. A water bottle comprising: a mouth section, a closure having a cross section of a circle or a polygon, the closure reversibly attachable to the mouth to close the bottle and removable from the mouth to open the bottle, the closure being single walled or double walled; a top shoulder section, a body section, a bottom shoulder section, and a base section located sequentially on a longitudinal plane; a transverse view of the body is a hexagon or an octagon; the bottle comprises planar filleted sides, and a reversibly removable cap that reversibly closes the bottle; the bottle further comprises a personal purification and filtration device removably contained, and provided entirely within, the bottle and configured for filtering and purifying a fluid or semifluid.

14. The water bottle according to claim 13, the cap being hexagonal or circular and being reversibly removable by a thread mechanism.

15. The water bottle according to claim 13, the bottle comprises aluminum.

16. The water bottle according to claim 13, wherein the base section comprises a bottom having a rounded, inwardly-formed indent.

17. In a re-usable water bottle, the improvement comprising the bottle having a plurality of planar walls suitable for bulk packaging and having a mouth and height operative to reversibly receive and contain a filtration device for water purification, the mouth having a closure with a cross section of a circle or a polygon, the closure reversibly attachable to the mouth to close the bottle and removable from the mouth to open the bottle, the closure being single walled or double walled, a reversibly removable cap that reversibly closes the bottle by a mechanism of threads located on an interior surface of the cap and on an exterior surface of the mouth of the bottle, and a personal purification and filtration device removably contained, and provided entirely within, the bottle and configured for filtering and purifying a fluid or semifluid.

18. The re-usable water bottle according to claim 17, wherein the bottle comprises a base section comprising a bottom having a rounded, inwardly-formed indent.

* * * * *